US008126615B2

(12) United States Patent
McMillen et al.

(10) Patent No.: US 8,126,615 B2
(45) Date of Patent: Feb. 28, 2012

(54) ADJUSTABLE SEAT BOLSTER FOR EASY ACCESS

(75) Inventors: Robert J. McMillen, Tecumseh (CA); Isa Rosli, Windsor (CA)

(73) Assignee: Schukra of North America Co., Tecumseh, Ontario (CA)

( * ) Notice: Subject to any disclaimer, the term of this patent is extended or adjusted under 35 U.S.C. 154(b) by 1095 days.

(21) Appl. No.: 11/572,073

(22) PCT Filed: Jul. 15, 2005

(86) PCT No.: PCT/US2005/025217
§ 371 (c)(1),
(2), (4) Date: Dec. 28, 2007

(87) PCT Pub. No.: WO2006/020069
PCT Pub. Date: Feb. 23, 2006

(65) Prior Publication Data
US 2008/0255733 A1    Oct. 16, 2008

Related U.S. Application Data

(60) Provisional application No. 60/588,124, filed on Jul. 15, 2004.

(51) Int. Cl.
*B60R 22/00* (2006.01)
(52) U.S. Cl. ................. 701/49; 296/65.01; 318/466
(58) Field of Classification Search .................. 701/49; 296/65.01; 318/466
See application file for complete search history.

(56) References Cited

U.S. PATENT DOCUMENTS

| 6,195,603 B1 * | 2/2001 | Gauger et al. .................. 701/49 |
| 6,922,622 B2 * | 7/2005 | Dulin et al. ..................... 701/45 |
| 2004/0155501 A1 * | 8/2004 | McMillen et al. ......... 297/284.4 |

FOREIGN PATENT DOCUMENTS

| FR | 2863964 A | 6/2005 |
| WO | WO 92/09451 A | 6/1992 |

* cited by examiner

*Primary Examiner* — Thomas Black
*Assistant Examiner* — Luke Huynh
(74) *Attorney, Agent, or Firm* — Michael Best & Friedrich LLP (57) ABSTRACT

An ergonomic device (10, 110) for a vehicle seat includes a pressure surface (106, 206) oriented toward a seat cushion so that the pressure surface deploys to support a seat occupant. A mount bracket (102, 202) fixes the device to a frame of the automobile seat. A linkage (112, 144, 166) between the pressure surface and said mount bracket allows the pressure surface to be selectively positionable between a first position disposed to extend for support of a seat occupant and a second position that is retracted. A power actuator (20, 130) is in operative communication with the linkage such that the power actuator mediates travel of the pressure surface between the first and second positions. The power actuator (20, 130) is in communication with a use anticipation indicator (40) such that the power actuator is engaged to place the pressure surface in the second, retracted position upon a signal from the use anticipation indicator.

22 Claims, 10 Drawing Sheets

Figure 10 ical motor (for example) receives a signal to engage or disengage, and thereby extend or retract the bolster. The signal may be received by the motor via a relay or a microprocessor. A relay or microprocessor in turn receives a signal from any of the variety of use anticipation indicators that a "use", that is a vehicle entry or exit, is about to occur. Anticipation indicators are triggered by inserting a key into the ignition, withdrawing the key from the ignition, placing the transmission in "park" position, engaging the parking brake, the triggering of a door sensor indicating that the door is opened or closed, or a user-operated switch.
ADJUSTABLE SEAT BOLSTER FOR EASY ACCESS

BACKGROUND OF THE INVENTION

1. Field of the Invention

The invention is in the field of ergonomic supports for motor vehicle seats, and particularly moveable bolsters for automobile seats.

2. Related Art

Ergonomic supports for vehicle seats including lumbar supports, side bolsters and the like generally achieve their function of providing support and comfort for a seat occupant by extending support to the body of a seat occupant. Particularly in the case of side bolsters on the seat back, seat bottom, or head rest of a seat, the extended position of a side bolster can be substantially raised from the base level of the plane of the seat back, seat bottom, or head rest. Hence, while the extension of ergonomic supports like side bolsters can substantially promote comfort after a seat occupant is positioned in the seat, they can conversely represent an obstruction to ingress and egress form the seat. There is a need in the art for ergonomic supports, particularly side bolsters, that can be extended for support, but that can provide for easy access of the driver or passenger into and out of the seat.

In prior art moveable bolster systems, a seat occupant entering or leaving his motor vehicle required an extra step by the user; to manually retract the bolster, such as by using a lever. This effort can be just as inconvenient as moving over the bolster without retracting it. In non-moveable bolster systems, the occupant enters or leaves the seat in less convenient fashion by simply moving over the extended bolster. Moving over a seat bolster can create additional wear on the seat upholstery. There is a need in the art for a moving bolster that retracts without the need for a human user to take the affirmative step of switching the actuator on or off.

As always, in the ergonomic support and motor vehicle arts, there is a continuing need for compact size, durability, flexibility of mounting configuration and economy.

SUMMARY OF THE INVENTION

It is in view of the above problems that the present invention was developed. The present invention is an ergonomic support, i.e., a side bolster, for a vehicle seat or head rest that retracts automatically upon receiving its signal of anticipated entry or exit of the seat occupant to or from the seat. The bolster is preferably actuated by an electrical motor, although other motors are conceived which will be useful. The electrical motor (for example) receives a signal to engage or disengage, and thereby extend or retract the bolster. The signal may be received by the motor via a relay or a microprocessor. A relay or microprocessor in turn receives a signal from any of the variety of use anticipation indicators that a "use", that is a vehicle entry or exit, is about to occur. Anticipation indicators are triggered by inserting a key into the ignition, withdrawing the key from the ignition, placing the transmission in "park" position, engaging the parking brake, the triggering of a door sensor indicating that the door is opened or closed, or a user-operated switch.

In keeping with the above advantages, the invention is briefly an ergonomic device for a motor vehicle seat. The device includes a pressure surface oriented toward a seat cushion such that the pressure surface deploys to support a seat occupant. A mounting bracket is adapted to be fixed to a frame of the vehicle seat. A linkage is connected between the pressure surface and the mount such that the pressure surface is selectively positionable between a first extended position for support of a seat occupant and a second retracted position. A power actuator is in operative communication with the linkage such that the power actuator mediates travel of the pressure surface between the first and second positions. The power actuator is in communication with a use anticipation indicator such that the actuator is engaged to place the pressure surface in the second, retracted position upon a signal from the use anticipation indicator.

The invention is also briefly a method of controlling extension and retraction of an ergonomic device for a motor vehicle seat. The method includes the steps of orienting a pressure surface proximate to a seat cushion such that the pressure surface can deploy to support a seat occupant, mounting, by a bracket, the pressure surface onto a frame of the vehicle seat; linking the pressure surface to the mounting bracket such that the pressure surface is selectively positionable between a first extended position deployed for support of a seat occupant and a second retractable position; engaging a power actuator in operative communication with the linkage such that the power actuator mediates travel of the pressure surface between the first position and the second position; and connecting the power actuator to a communicator with a use anticipation indicator such that the actuator is engaged to place the pressure surface in the second, retracted position upon a first signal from the use anticipation indicator.

Further features and advantages of the present invention, as well as the structure and operation of various embodiments of the present invention, are described in detail below with reference to the accompanying drawings, wherein like elements are indicated by like reference numbers. Not all portions of the new device are seen in all figures, for simplicity.

BRIEF DESCRIPTION OF THE DRAWINGS

The accompanying drawings, which are incorporated in and form a part of the specification, illustrate the embodiments of the present invention and together with the description, serve to explain the principles of the invention. In the drawings.

DETAILED DESCRIPTION OF THE PREFERRED EMBODIMENTS

Figure 1:
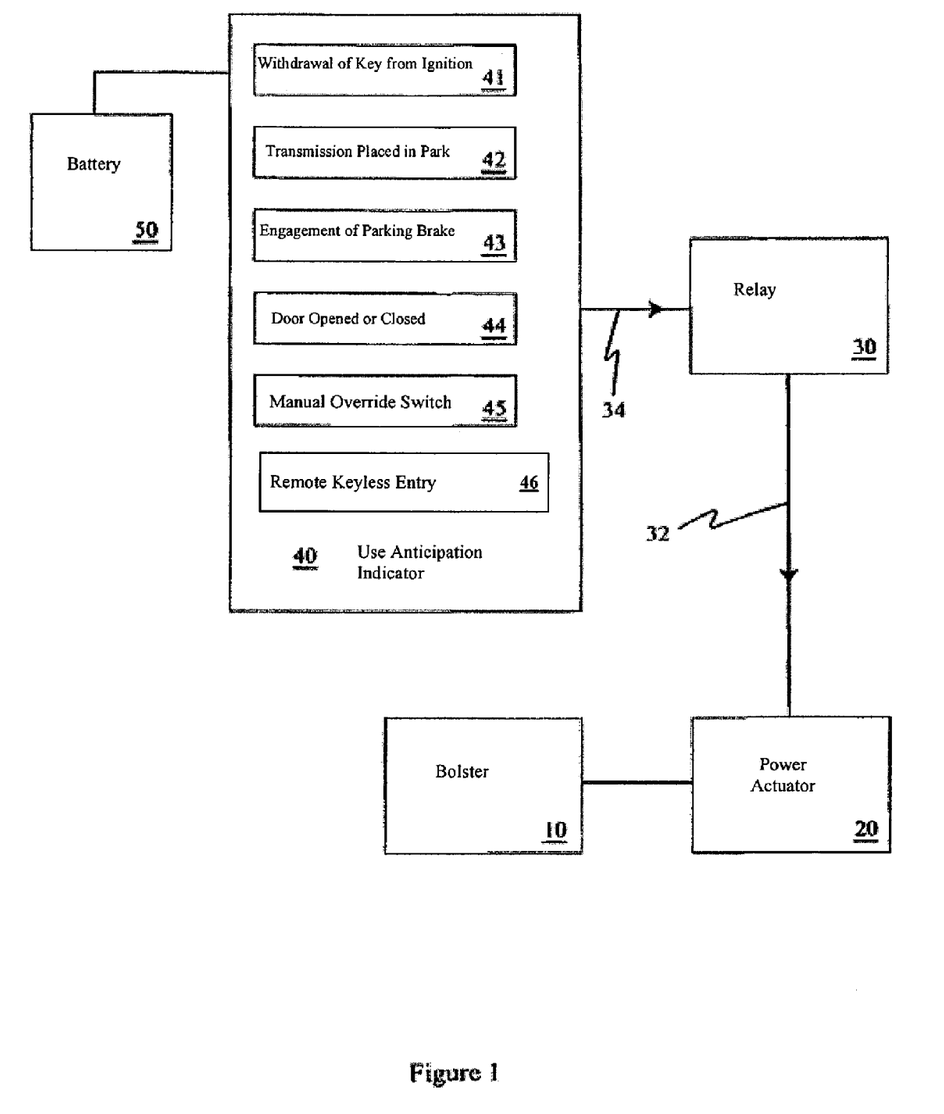
FIG. 1 is a schematic diagram of the components of the present invention.

Referring to the accompanying drawings in which like reference numbers correspond to like elements, FIG. 1 is a schematic diagram of the system the adjustable bolster for easy access. The ergonomic supports, e.g. bolsters, that are activated and controlled by the system of the present invention have in common the capacity to move between an extended position that ergonomically supports the weight of the seat occupant, and a retracted position. The retracted position is flatter than the extended position. Accordingly, the flatter position allows for easier access of a passenger or driver into and out of a seat.

In FIG. 1 the ergonomic support device, i.e. bolster 10 is in operative communication with a power actuator 20. In the embodiments depicted herein, the power actuator is preferably, although not necessarily, an electric motor that powers a traction cable or Bowden cable. Motor 20 is turned on and off, that is, the power actuator is engaged for actuation or disengaged, through relay 30. Relay 30 can be a simple electrical relay, for example, such as is known in the art. Relay 30 can also be a microprocessor configured to receive an electrical signal and, and in response to that electrical signal output a different electrical signal to the motor 20. The microprocessor (or relay) output signal 32 engages or disengages motor 20 to actuate extension or retraction of the bolster 10.

The relay 30 receives an input signal 34 from a use anticipation indicator (UAI) 40. The structure of the present invention permits automatically retracting or flattening the bolster to make access to the seat easier when a seat occupant gets into the vehicle or gets out of it. Accordingly, the use indication indicator as used herein is defined as any switch, or sensor capable of generating a signal (usual electrical) to the relay or microprocessor 30 wherein the signal corresponds to an action indicating that use is anticipated. "Use", as used herein, means that it is anticipated that a seat occupant will enter or exit the seat. Accordingly, the use anticipation indicator may be, without limitation, any one of the following: the withdrawal of the key from the ignition 41, the transmission being placed in park 42, engagement of the parking brake 43, a sensor engaged with the door to indicate that the door has been opened or closed 44, or a manual override switch 45, or a signal received from a remote keyless entry system 46. Any of these devices may be used in combination or individually and other potential UAI's are conceivable to one skilled in the art.

It will be appreciated that the present invention is used in bolster systems, many of which are powered and designed to be actuated through a range of standard positions according to actuation signals. In these current systems, there is usually a switch for actuating the powered bolster using actuation signals and the powered bolster would even have a fully retracted position, but this position is not selected based on any set of entry/egress criteria, such as the set listed above. According to the present invention, the set of entry/egress criteria is used to provide an entry/egress signal which permits the powered bolster to retract back into is entry/egress position, and this position is further retracted than the fully retracted position. Absent the entry/egress signal, the powered bolster operates in the range of standard positions, and when the entry/egress criteria is triggered, the entry/egress signal permits further retraction of the bolster into the entry/egress position.

It will also be appreciated that a number of the entry/egress triggers can be unrelated to any bolster operation switch that may be used for adjusting the bolster's positions, such as the following triggers: unlocking a vehicle door—whether by remote keyless entry or by inserting a key into the lock, withdrawing a key from the ignition or otherwise turning off the engine, placing the transmission in "park" position, engaging the parking brake, and triggering a door open/shut sensor. Therefore, one or more of these entry/egress triggers could automatically generate and send the entry/egress signal to the bolster system and a manually-operated switch may not even be necessary for the entry/egress signal. Of course, it is also possible that one or more of these entry/egress triggers could also be used in conjunction with the bolster operation switch. Alternatively, the bolster operation switch could include switch positions for the standard mode of operation and could have a separate position for the entry/egress mode of operation. Only when the switch is set into the entry/egress position would the bolster be pulled back into the entry/egress position. The switch's entry/egress position could even be enabled by the entry/egress triggers, being disabled when one of the entry/egress conditions are not met so that if the entry/egress switch position is accidentally selected, the entry/egress signal would not be generated until one or more of the entry/egress conditions is met.

The battery 50 supplies power for the signals 32 and 34 and the motor 20 and relay 30. Given the description of the entry/egress triggers and the standard mode of operation for the bolster, it will be appreciated that the relay 30 preferably determines the bolster's mode of operation. Therefore, the relay 30 can also generate and send either a standard operating signal corresponding with the bolster's standard range of operation or an entry/egress signal that causes the actuator 20 to pull the bolster 10 back into its entry/egress position.

Figure 6:
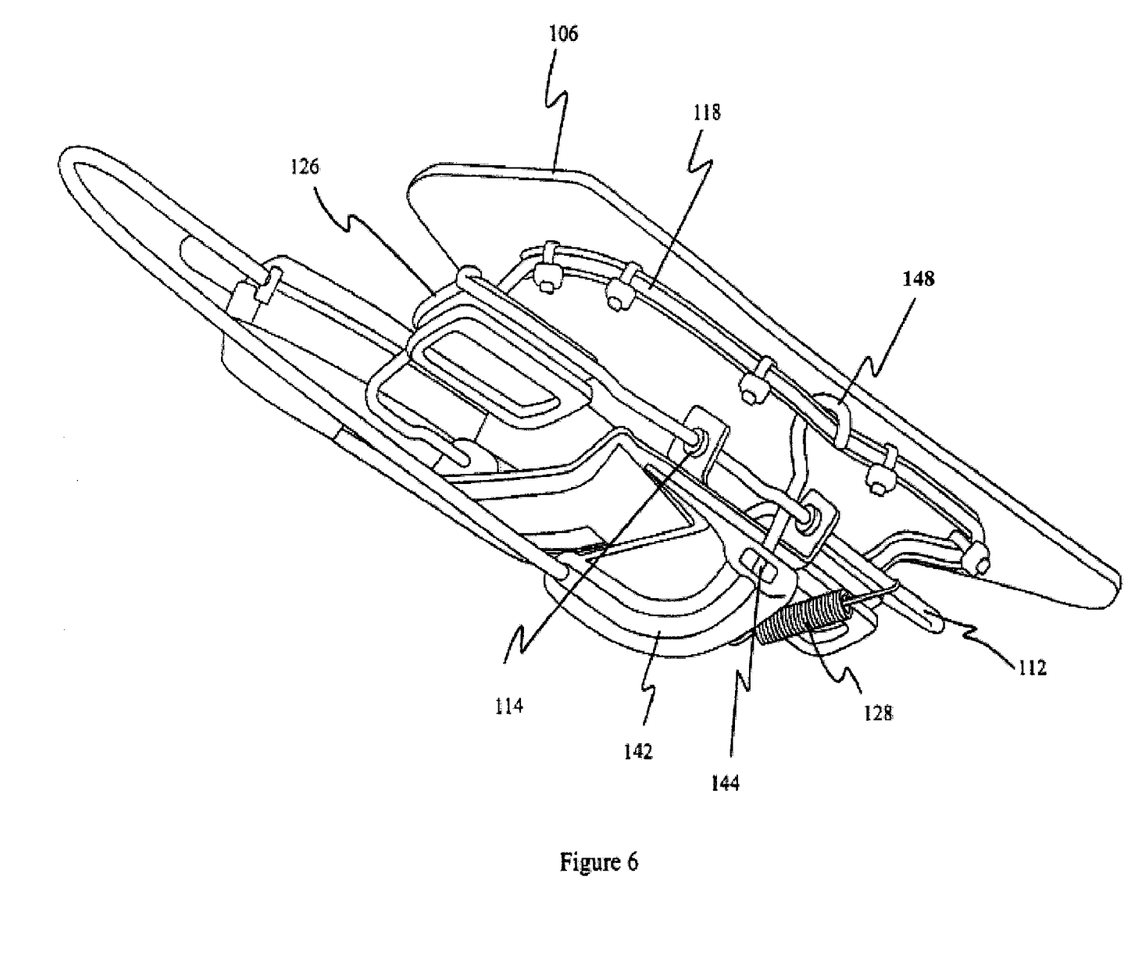
FIG. 6 is a lateral view of the invention of FIG. 2 shown in a retracted position.

FIGS. 2-6 depict a first embodiment of the easy access side bolster of the present invention. FIGS. 2, 3, 4 and 5 depict the bolster in an extended position. FIG. 6 depicts the bolster in a retracted position.

Bolster device 10 includes mounting bracket 102, which serves to connect device 10 to the frame of a vehicle seat, and a pressure surface 106. The bracket includes a slot 104, which serves as a slide. In the depicted embodiment, the slide slot 104 includes a widened portion. This widened portion is used during assembly for inserting a slider 108. The slider 108 has an "H" shaped cross section wherein flanges define a slot therebetween. The bracket slot 104 engages the defined H-shaped slot in the slider 108 so that the slider 108 can move laterally along the slide 104.

An extendable linkage is established between the bracket 102 and the pressure surface 106. The linkage is designed to receive a force, which in the depicted embodiment is a tractive force, and convert it into motion of the pressure surface outwards toward the seat occupant into an extended position, or rearwards away from the seat occupant towards a retracted position. The linkage includes a hinge bar 112 which is pivotably attached to the mounting bracket 102 at the bracket's lateral extent. The pivoting connection of the hinge bar with the bracket is at two antifriction sleeves 114. These allow the hinge bar to rotate around a vertical axis. The linkage also includes a bolster wire 116. The bolster wire has an outer extent 118. The pressure surface 106 is mounted by attachment to the outer extent 118 of the bolster wire 116. The bolster wire also has an inner extent 122 which is pivotably attached to the slider 108 at a pivot 124. In the depicted embodiment, the pivot 124 is a snap fit preferably integrally fabricated into the molded plastic slider 108. This allows the bolster wire to rotate in an arc around a vertical axis. In the depicted embodiment, this rotation of the bolster wire will happen concurrently with a lateral sliding movement of the slider 108 along the slide 104.

The hinge bar and bolster wire are engaged together at pivot plates 126. The pivot plates are fixedly attached to the bolster wire at a position intermediate the medial aspect 122 and lateral aspect 118 of the bolster wire 116. Pivot plates 126 are pivotably engaged with the hinge bar 112 so that the hinge bar 112 may pivot around the vertical axis. The vertical axis defined by the engagement of the hinge bar 112 with the pivot plates 126 can also move laterally in response to the sliding motion of slider 108 which carries with it bolster wire 116.

The depicted embodiment of FIGS. 2-6 is in an upright position, as it would be when mounted in known manner on the back of the vehicle seat. It is within the scope of the present invention that the same embodiment may be mounted on a seat bottom to be used as a thigh support. In such a case, the pivot axes would be substantially horizontal.

A spring 128 is engaged with the linkage in order to bias it into a first or second position. The first and second positions are extended or retracted. In the depicted embodiment, a suspension or traction spring 128 is attached at one end to the medial aspect 122 of the bolster wire 116 and also attached to the hinge bar 112. Accordingly, spring 128 biases the pressure surface 106 outward towards a first, engaged position, where it supports the seat occupant. This deployment of the spring allows the spring to serve a dual function. First it acts as a shock absorber, thereby accentuating the comfort and support received by a seat occupant from the bolster pressure surface 106. Secondly, it maintains the bolster in an extended supporting position, without the engaging of any electrical force application device for a maintenance position that will be used for a long period of time. That is, electrical force will be applied to overcome the spring bias during entry and exit to and from the vehicle, meaning that electrical force is only needed for a short and therefore more economical period of time.

Motion of the bolster 10 is achieved by motor 130. The motor is engaged with a pulley and spindle system 136, according to prior art techniques. The power actuator 130 and spindle device 136 are operatively engaged with the traction cable 138. In the depicted embodiment, the traction cable 138 is a Bowden cable. Traction cables are known in the art. They are composed of an outer conduit or sleeve through which axially slides a cable. By anchoring one of the cable end or sleeve end at one terminus of the Bowden cable and moving the other of the sleeve end or cable end mechanically, a similar motion can be effective at the opposite end of the Bowden cable. Accordingly, the power actuator device 136 pulls a cable through the traction cable sleeve in order to apply tractive force at the opposite end of the cable. In the depicted embodiment, the terminus of traction cable 138 includes a ferrule 142 which turns the cable 90 degrees. The Bowden cable sleeve is anchored to the bracket so as to be immobile at anchor mount 144. From the Bowden cable sleeve extends the Bowden cable wire 146 which is attached by a hook 148 to the lateral aspect 118 of the bolster wire 116. This deployment allows the traction cable to apply a tractive force to the bolster wire 116 in order to pull it back from an extended position towards a second retracted position.

In operation, the system of the present invention receives an anticipated use indication signal from any of a variety of use anticipation indicators. That is, the door opens and a sensor signals the system, the parking brake is engaged and a sensor signals the system, a key is withdrawn from the ignition and a signal is sent to the system, a remote keyless entry signal is sent to the vehicle and a signal is sent to the system, the transmission is put in park and a signal is sent to the system or optionally a user's manual use of a switch may signal the system. Other use anticipation indicators may be deployed for use with the system of the present invention. The use commonly anticipated by all of these indicators is that a seat occupant will enter the seat or leave it. In either of these actions, the invention executes the retraction of the seat bolster to a second, flat position, thereby easing ingress and egress of the seat occupant.

Figure 2:
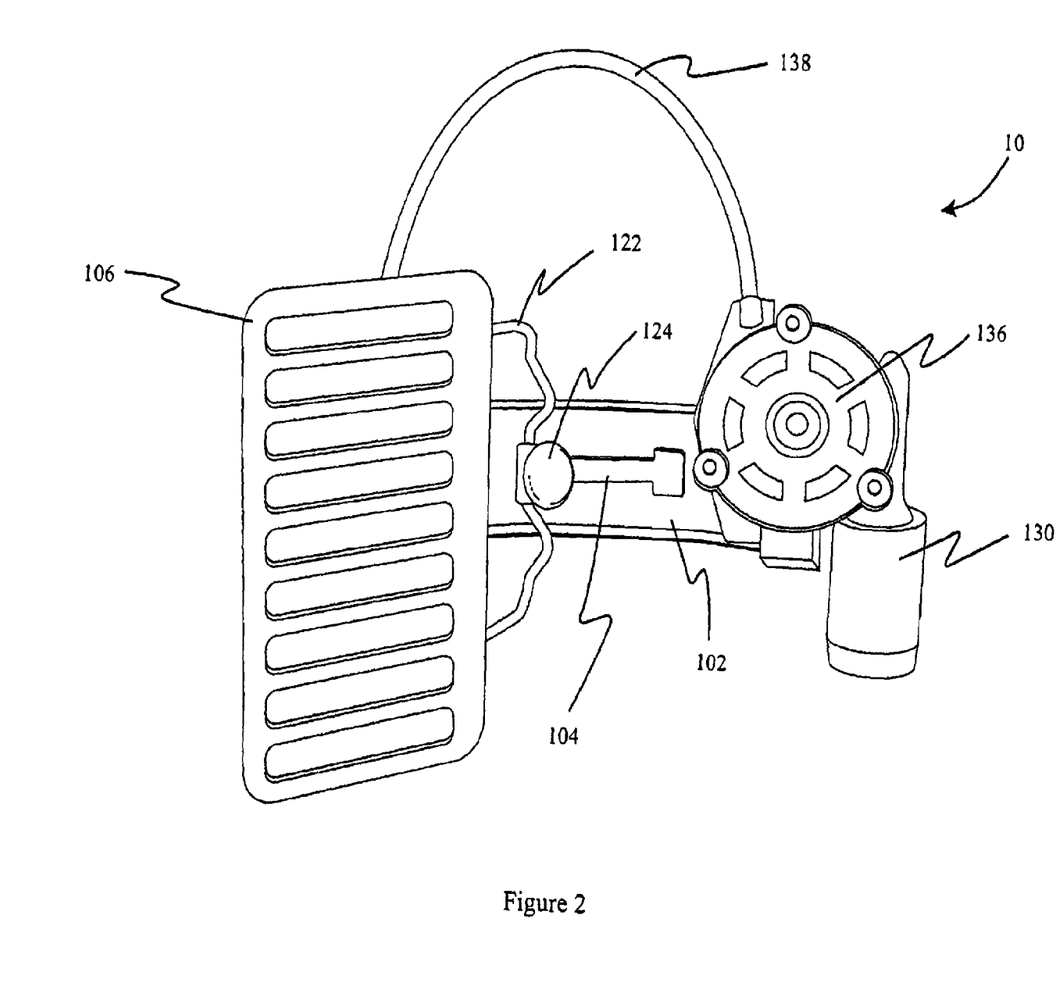
FIG. 2 is a front view of a first embodiment of an ergonomic device in keeping with the present invention.
Figure 3:
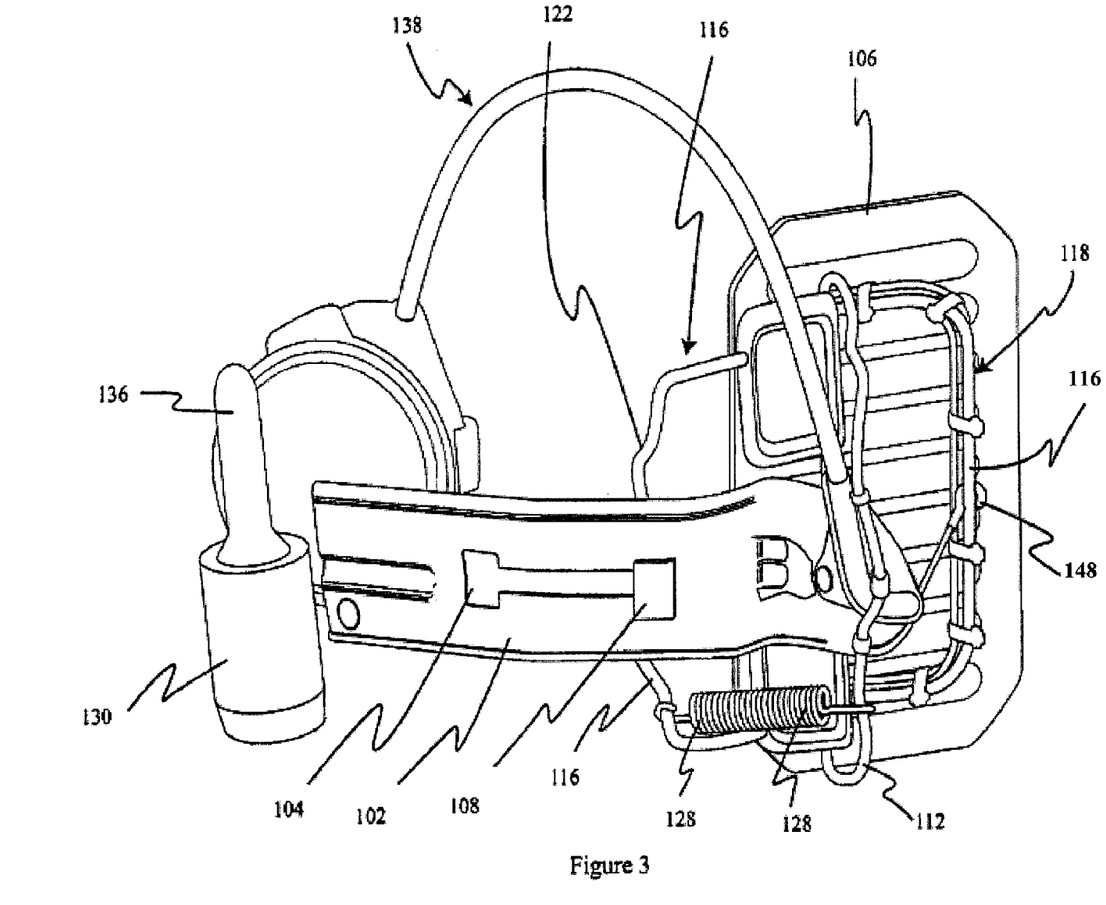
FIG. 3 is a back view of the embodiment shown in FIG. 2.
Figure 4:
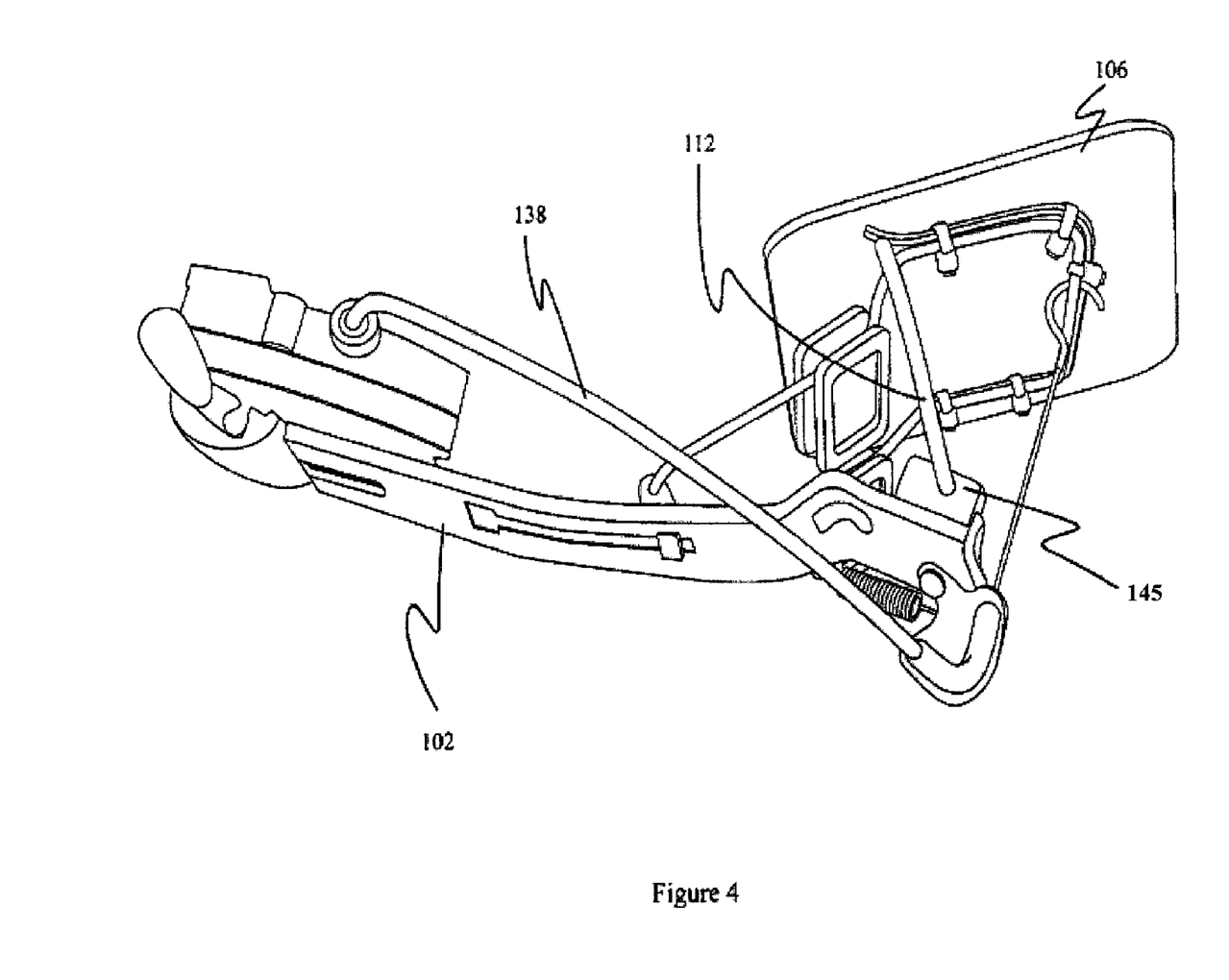
FIG. 4 is a top view of the embodiment of FIG. 2 in an extended position.
Figure 5:
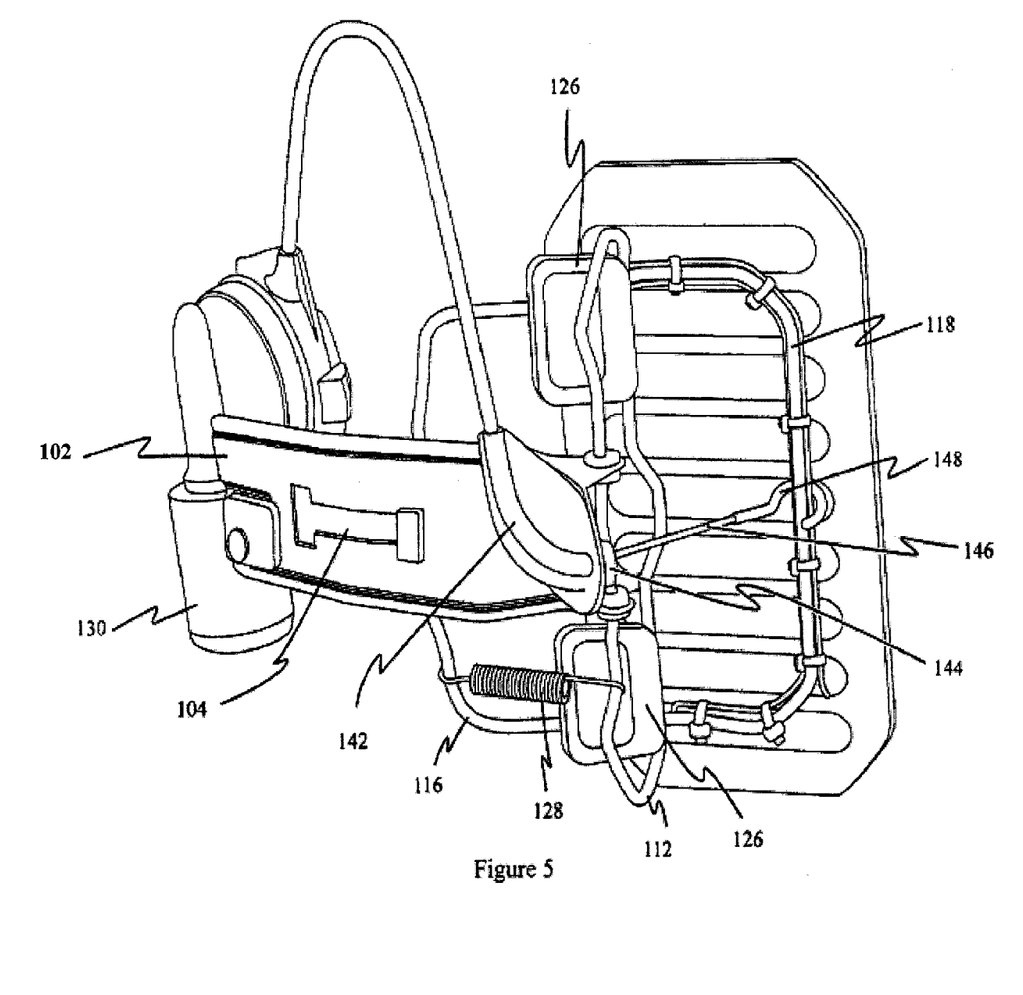
FIG. 5 is a perspective view of the invention shown in FIG. 2 in an extended position.

Upon receipt of the anticipated use signal, the relay or microprocessor 30 sends a signal to the motor 20 to activate. The pressure surface 106 has been residing in its extended, supporting first position and maintained there by spring 128. Engagement of the motor 20/130 applies a tractive force through the power actuator device 136, Bowden cable 138 and ultimately to the lateral extent 118 of the bolster wire 116 through traction applied by Bowden cable 138.

The retraction of the pressure surface 106 is mediated in a controlled fashion by the relatively rigid bolster wire 116 pivoting at pivot 124 on slider 108, thereby causing slider 108 to slide laterally along slide 104. Hinge bar 112, which is the structural component that supports weight when the unit is extended, pivots at its pivot point 145. Antifriction sleeves 114 cause this to be a smooth motion. The hinge bar also pivots at its engagement with pivot plates 126. The fixed pivot 145 of the hinge bar 112 causes the pressure surface to retract in an inward, as well as a rearward fashion, thus contributing to a compact shape of the unit in its retracted position. The hinge bar and bolster wire 116 turn through complementary, opposing arcs. The slider 108 moving laterally inwards also facilitates the retraction of the pressure surface 106 into a compact configuration.

After a user has entered or exited the vehicle, the anticipated use indicator will signal the end of use in any manner complementary to its original signal of anticipated use. That is, the door sensor will indicate that the door has been closed, the transmission sensor will sense that the transmission has been moved to a drive position, the parking brake sensor will signal that the parking brake has been released, etc. These signals will be received by the relay 30 and the output signal 32 from the relay will then turn off the motor 20/130 and release the tractive force supplied by the Bowden cable wire 148, thereby allowing the spring 128 to bias the pressure surface 106 back out to its supporting position towards an extended regular use.

Figure 7:
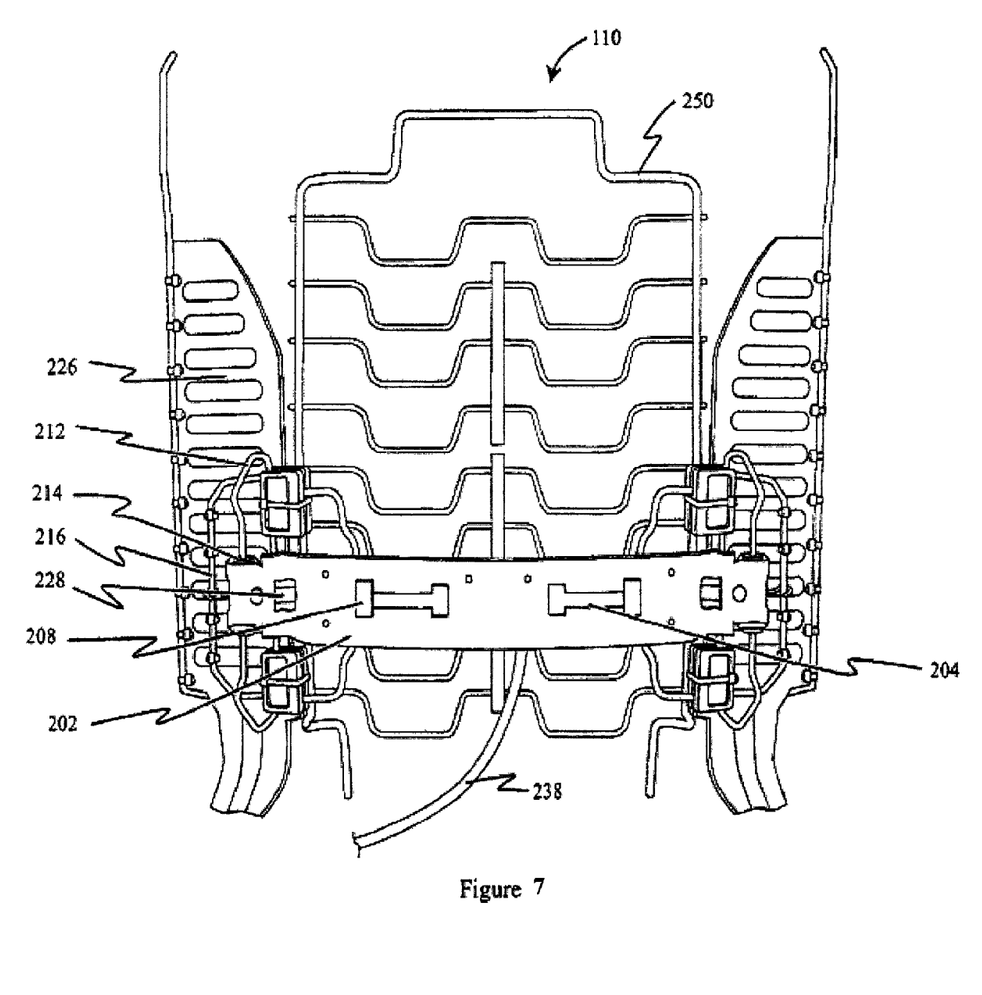
FIG. 7 is a front view of a second embodiment of an ergonomic device of the present invention.
Figure 8:
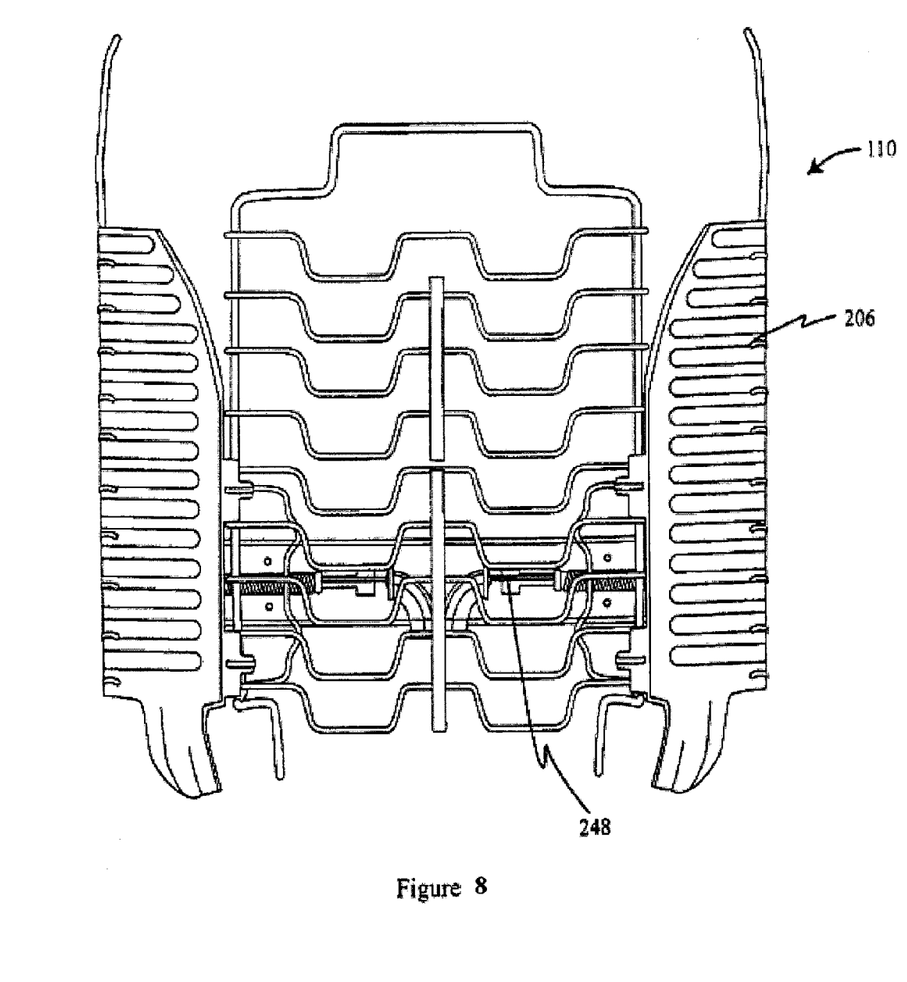
FIG. 8 is a back view of the device of FIG. 7.
Figure 9:
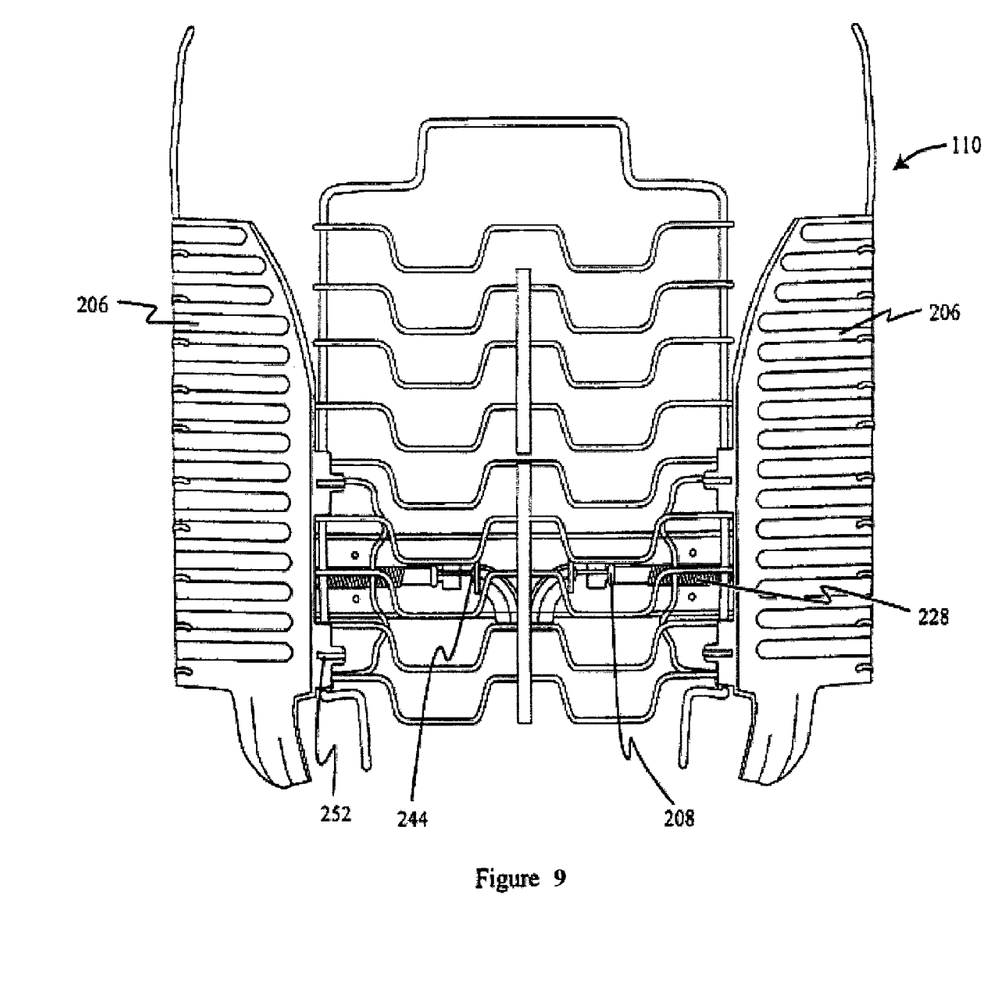
FIG. 9 is a top view of the embodiment of FIG. 7.

FIGS. 7, 8, and 9 depict an alternative embodiment (generally designated 110) of the present invention in which side bolsters 206 are attached to an overall lumbar support frame 250. Hinge bars 212 and bolster wires 216 operate substantially as described above. There is again a bracket 202 having a slide which in the depicted embodiment is a slot 204 as in the first embodiment a hinge bar 212 rotates around a fixed pivot point 214 and pivot plates 226 again allow for pivoting motion between the hinge bar 212 and bolster wire 216.

FIGS. 7, 8, and 9 are used to depict a center alignment deployment of the Bowden cable 238 and spring 228. The depicted embodiment is shown in its extended position in FIGS. 7 and 8. In this extended position it can be seen that the slider 208 is moved to its lateral extent in the slide or slot 204. In FIG. 9 it can be seen that the slider 208 is moved to its medial extend in slot 204. In operation, the spring 228 applies traction to the hinge bar 212 in order to draw it laterally. The opposing end of the spring is anchored at any of the variety of positions, including but not limited to the lateral aspect of the bracket 202, the hinge bar 212 or the lumbar support frame 250. The Bowden cables are also anchored medially at 244. The Bowden cable wires 248 are attached to the linkages at a vertically central position, which in the depicted embodiment is on the hinge bar mount 252.

In operation, the pressure plates 206 are maintained in their extended position by the traction applied by spring 228 to bias the bolster wire 216 outwards. A power actuator applies traction on a medial aspect of the bolster wire 216 at Bowden cable mount 252, in order to pull it medially, overcoming the force of spring 228. Actuation of the Bowden cable 238 is in response to an anticipated use signal as described for the previous embodiment.

Figure 10:
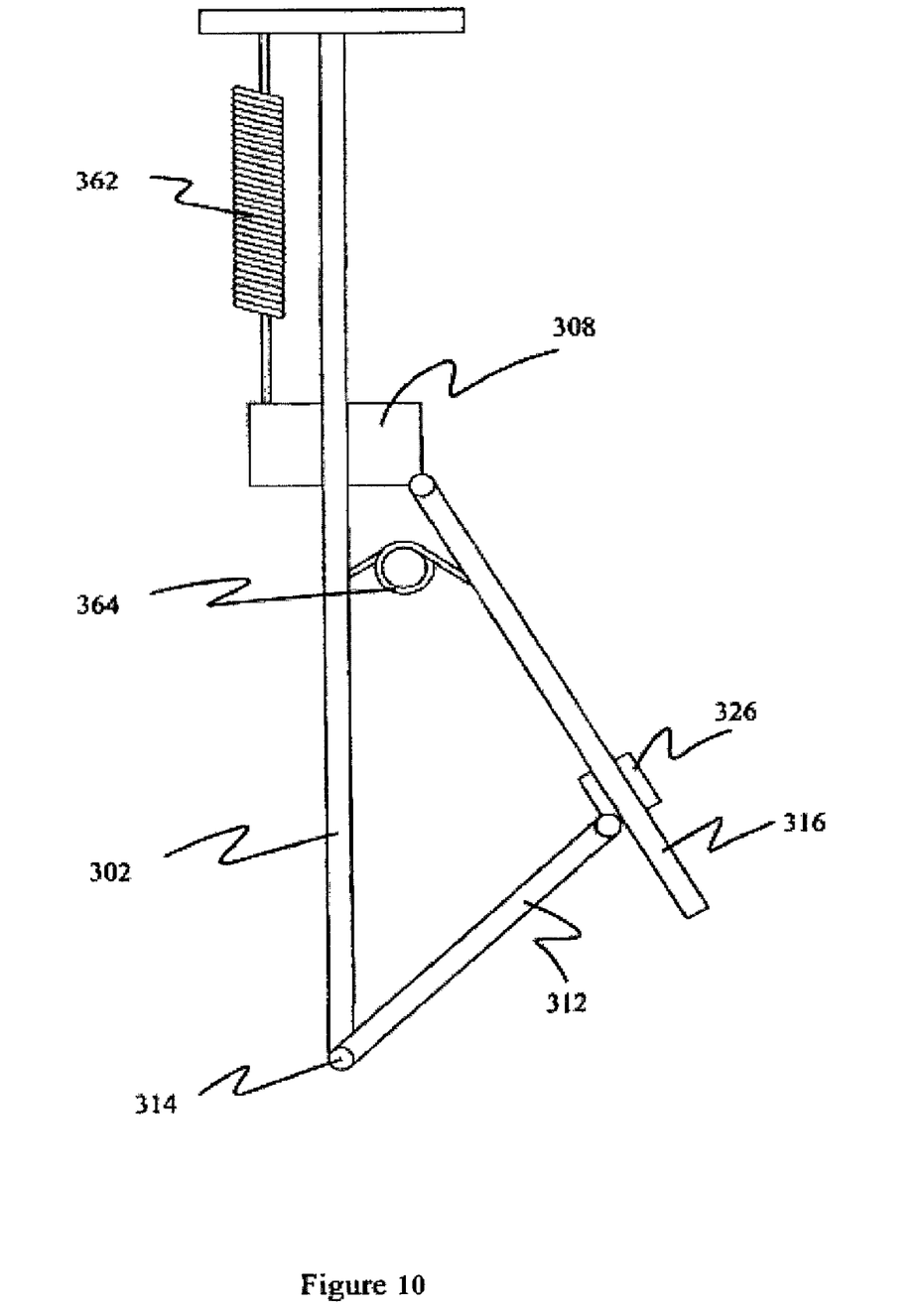
FIG. 10 is a side view of further embodiments of the invention.

FIG. 10 is a schematic drawing showing alternative springs that may be used to bias the linkage towards its extended position. Such springs can be substituted in the embodiments previously described. Throughout the specification, if an embodiment is not specifically limited to the certain structure, then it is to be understood that the corresponding structure from other embodiments herein may be usefully substituted. Once again a mounting bracket 302 has on it a slider 308. A bolster wire 316 holds a pressure surface (omitted for clarity). A hinge bar 312 is pivotably attached to the mount 314 and also pivotably attached to a pivot plate 326.

In the depicted embodiment, it can be seen that a compression spring 362 may be mounted between the slider 308 and any convenient surface, for example the power actuation device. This spring will bias the slider outwards, which would also bias the bolster into an extended position. Also a torsion spring 364 may be deployed as shown to bias the bolster into its extended position. Other types of know spring devices can also be useful in the invention.

In view of the foregoing, it will be seen that the several advantages of the invention are achieved and attained.

The embodiments were chosen and described in order to best explain the principles of the invention and its practical application to thereby enable others skilled in the art to best utilize the invention in various embodiments and with various modifications as are suited to the particular use contemplated.

As various modifications could be made in the constructions and methods herein described and illustrated without departing from the scope of the invention, it is intended that all matter contained in the foregoing description or shown in the accompanying drawings shall be interpreted as illustrative rather than limiting. Thus, the breadth and scope of the present invention should not be limited by any of the above-described exemplary embodiments, but should be defined only in accordance with the following claims appended hereto and their equivalents.

What is claimed is:

1. An ergonomic device for a vehicle seat comprising:
   a pressure surface oriented toward a seat cushion such that said pressure surface deploys to support a seat occupant;
   a mounting bracket adapted to be connected to a frame of the vehicle seat;
   a linkage between said pressure surface and said mounting bracket such that said pressure surface is selectively positionable between a first position disposed to extend for support of a seat occupant and a second position that is retracted;
   a power actuator in operative communication with said linkage such that said power actuator mediates travel of said pressure surface between said first and second position;
   said power actuator being in operative communication with a use anticipation indicator such that said power actuator is engaged to place said pressure surface in said second, retracted position upon a signal from said use anticipation indicator; and
   characterized in that said linkage includes a bolster wire and slider mechanism.

2. The device of claim 1 wherein said use anticipation indicator is a position of a key relative to an ignition.

3. The device of claim 1 wherein said use anticipation indicator is a door sensor.

4. The device of claim 1 wherein said use anticipation indicator is a parking brake sensor.

5. The device of claim 1 wherein said use anticipation indicator is a transmission position sensor.

6. The device of claim 1 wherein said use anticipation indicator is a user operated switch.

7. The device of claim 1, wherein said linkage is comprised of
   a hinge bar pivotably attached to the mounting bracket; and
   a bolster wire pivotably attached to a slider and pivotably attached to said hinge bar,
   said slider being slidingly engaged with said bracket.

8. An ergonomic device for a vehicle seat comprising:
   a pressure surface oriented toward a seat cushion such that said pressure surface deploys to support a seat occupant;
   a mounting bracket adapted to be connected to a frame of the vehicle seat;
   a linkage between said pressure surface and said mounting bracket such that said pressure surface is selectively positionable between a first position disposed to extend for support of a seat occupant and a second position that is retracted;
   a power actuator in operative communication with said linkage such that said power actuator mediates travel of said pressure surface between said first and second position;
   said power actuator being in operative communication with a use anticipation indicator such that said power actuator is engaged to place said pressure surface in said second, retracted position upon a signal from said use anticipation indicator; and
   characterized in that said power actuator includes:
   a motor;
   a gear and spindle, being in driveable operative engagement with said motor; and
   a traction cable having a first end and a second end, said first end being in operative communication with said gear and spindle and said second end being disposed to apply a tractive force to said linkage.

9. The device of claim 8 wherein said traction cable is oriented at said second end to be generally aligned with a slide on a bracket.

10. The device of claim 1 further comprising said power actuator being in operative communication with the use anticipation indicator such that said actuator is engaged to place said pressure surface in said first, extended position upon receiving a second signal from said use anticipation indicator.

11. An ergonomic device for a vehicle seat comprising:
    a pressure surface oriented toward a seat cushion such that said pressure surface deploys to support a seat occupant;
    a mounting bracket adapted to be connected to a frame of the vehicle seat;
    a linkage between said pressure surface and said mounting bracket such that said pressure surface is selectively positionable between a first position disposed to extend for support of a seat occupant and a second position that is retracted;
    a power actuator in operative communication with said linkage such that said power actuator mediates travel of said pressure surface between said first and second position;
    said power actuator being in operative communication with a use anticipation indicator such that said power actuator is engaged to place said pressure surface in said second, retracted position upon a signal from said use anticipation indicator; and
    characterized in that a spring is in operative communication with said linkage in order to bias said pressure surface.

12. The device of claim 11 wherein said spring is a compression spring.

13. The device of claim 11 wherein said spring is a tension spring.

14. The device of claim 11 wherein said spring is a torsion spring.

15. The device of claim 11 wherein said spring is generally aligned with a slot on a bracket.

16. The device of claim 11 wherein said spring is operatively engaged at a first end to a medial aspect of a bolster wire and operatively engaged at a second end of said spring to a hinge bar.

17. The device of claim 1 wherein said pressure surface is biased towards an extended position.

18. The device of claim 1 wherein said ergonomic device is a bolster.

19. The device of claim 18 wherein said bolster is a seat back bolster.

20. The device of claim 18 wherein said bolster is a seat bottom bolster.

21. A method of controlling extension and retraction of an ergonomic bolster device for a vehicle seat comprising:
- orienting a pressure surface proximate to a seat cushion such that the pressure surface may deploy to support a seat occupant;
- mounting by a bracket the pressure surface onto a frame of the vehicle seat;
- linking the pressure surface to the mounting bracket such that the pressure surface is selectively positionable between a first position deployed to extend for support of a seat occupant and a second position that is retracted;
- engaging a power actuator in operative communication with the linkage such that the power actuator mediates travel of the pressure surface between the first position and the second position;
- connecting the power actuator to a communicator with a use anticipation indicator such that the power actuator is engaged to place the pressure surface in the second, retracted position upon a first signal from the use anticipation indicator; and
- characterized by using a linkage including a bolster wire and slider mechanism.

22. The method of claim 21 further comprising connecting said power actuator with a use anticipation indicator such that said actuator is engaged to place said pressure surface in said first, extended position upon a second signal from said use anticipation indicator.

* * * * *